United States Patent [19]
Jackson

[11] Patent Number: 5,079,200
[45] Date of Patent: Jan. 7, 1992

[54] DETECTOR MATERIAL FOR UNCOOLED THERMAL IMAGING DEVICES

[75] Inventor: David A. Jackson, Springfield, Va.

[73] Assignee: The United States of America as represented by the Secretary of the Army, Washington, D.C.

[21] Appl. No.: 571,481

[22] Filed: Aug. 23, 1990

[51] Int. Cl.[5] .............................................. C04B 35/46
[52] U.S. Cl. .................................... 501/136; 501/134
[58] Field of Search ....................... 501/134, 135, 136

[56] References Cited

U.S. PATENT DOCUMENTS

| | | | |
|---|---|---|---|
| 4,119,886 | 10/1978 | Jyomura et al. | 315/101 |
| 4,228,482 | 10/1980 | Bouchard et al. | 361/321 |
| 4,582,814 | 4/1986 | Thomas | 501/136 |
| 4,874,727 | 10/1989 | Ohya et al. | 501/34 |

Primary Examiner—William R. Dixon, Jr.
Assistant Examiner—Chris Gallo
Attorney, Agent, or Firm—Milton W. Lee; John E. Holford; Anthony T. Lane

[57] ABSTRACT

A solid solution, ferroelectric material with a selectable Curie point composed of lead titanate and a larger amount of strontium titanate is provided for use as a thermal detector material in ferroelectric uncooled infrared imaging systems.

5 Claims, 2 Drawing Sheets

DETECTOR MATERIAL FOR UNCOOLED THERMAL IMAGING DEVICES

The invention described herein may be manufactured, used, and licensed by the U.S. Government for governmental purposes without the payment of any royalties thereon.

BACKGROUND OF INVENTION

1. Field

The invention involves thermal detectors and imagers sensitive to infrared radiation, particularly in the 8 to 14 micron wavelength region of the electromagnetic spectrum.

2. Prior Art

Thermal detectors and imagers may be generally divided into two classes, those which are quantum detectors such as solid state photoconductors, diodes and transistors; and those which employ thermally sensitive materials such as ferroelectric and pyroelectric compounds. The former class includes the group III-V and group II-VI materials such as Gallium Arsenide and Cadmium Mercury Telluride. The latter class includes such materials as Barium Titanate, Rochelle Salt and Tri-glycine sulfate. Each material has its characteristic Curie point, i.e., the transition temperature where the material changes from being ferroelectric to paraelectric. This is accompanied by a rapid decrease in the dielectric constant as the temperature reaches the Curie point. By selecting proper amounts of two related materials a solid solution of the two materials may be fabricated which has a room temperature Curie point. For instance, a solid solution made of 66% $BaTiO_3$ and 34% $SrTiO_3$ should have a Curie point of approximately 20 C, i.e., room temperature. With such a material very small changes in thermal energy can be detected as the material goes through the transition point, as manifested in large changes in electronic capacitance or large changes in the electric constant. These dramatic changes in values constitute an electronic signal. When this material is made into an array of very small detectors the resulting electronic signals from all the detectors form an electronic image of the thermal scene.

An important aspect of using Barium Strontium Titanate (BST) of this composition in such an array is the fact that unlike most thermal (IR) imaging systems, this system is uncooled; operating at room temperature by design. BST is, however, one of the most expensive and not necessarily the ideal material for this type of system. An object of the present invention is to provide an alternative material to BST operating in the same manner and utilizing similar characteristics in a thermal imaging system for operation at room temperature.

SUMMARY OF THE INVENTION

A thermal imager is provided by using an array of extremely small ceramic ferroelectric detectors made of a solid solution of lead and strontium titanates. In particular a solid solution containing approximately 64-68 percent strontium titanate provides a detector material that has a Curie temperature and maximum sensitivity near standard or room temperature. Such a detector material needs no cooling for adequate operation.

BRIEF DESCRIPTION OF THE DRAWINGS

The invention is best understood with reference to the drawings, wherein.

DESCRIPTION OF THE PREFERRED EMBODIMENT

Figure 1:
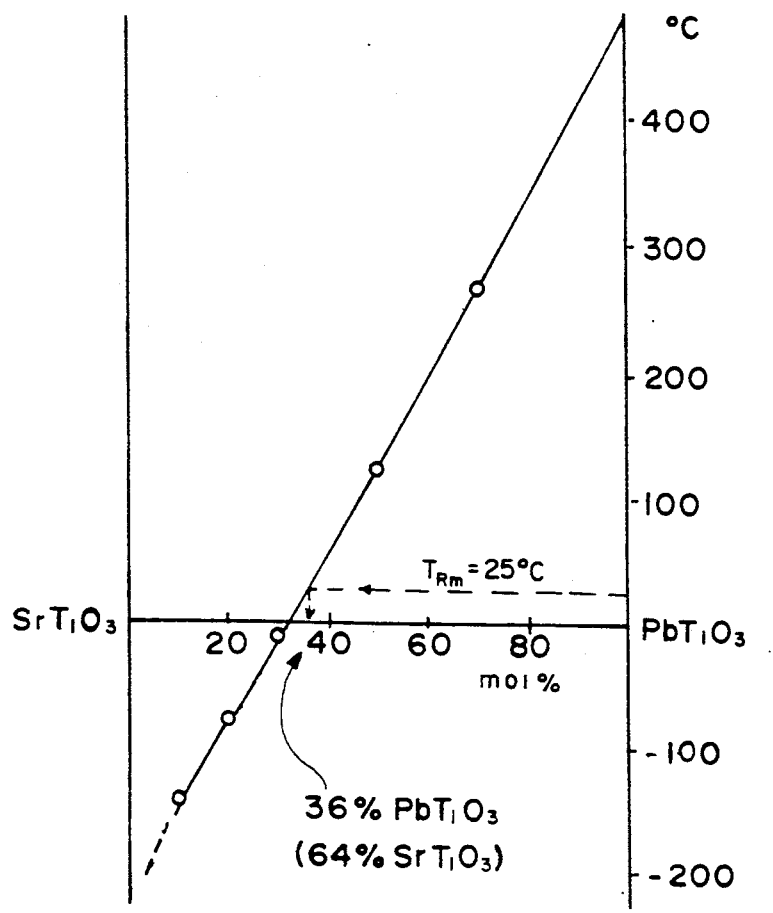
FIG. 1 shows a graph of Curie temperatures vs. molar percentage composition for the solid solutions of $SrTiO_3$ and $PbTiO_3$.

FIG. 1 is a graph of a broad range of solid solutions formed from lead and strontium titanates published by Nomura and Sawada; Journal of the Physical Society of Japan; Vol. 10; #2, page 109 (1955). As can be seen on the graph the Curie temperature drops steadily with increased percentage of strontium titanate. Also as can be seen on the graph, pure lead titanate yields a high Curie temperature or centrigrade Curie point between 400° and 500° C., while pure strontium titanate yields a low Curie point more than 200 degrees below zero centigrade. Combining these two materials provides a thermal detector material with a maximum sensitivity or Curie point to match any ambient temperature desired between these high and low points. At approximately room temperature, the percentage of strontium titanate reaches 64–38%. As described in the current literature, various titanates can be made by different processes. For thin films, vacuum evaporation, e-beam deposition, flash evaporation, sputtering and laser ablation have been used with varying degrees of success. Sol-gel methods described by S. R. Gurkovich and J. B. Blum; "Ultrastructure Processing of Ceramic Glasses and Composites"; Chap 12; Hench and Ulrich Editors; J. Wiley & Sons 1984, have also been successful. Bulk titanates have been successfully made by preciptation via alkoxide routes using such materials as titanium isopropoxide.

Using the alkoxide method, the dried preciptate is ground, compacted and sintered in the form of plates. These are then cut and thinned to proper dimensions for the processing of devices in an array.

Instead of fabricating an array from thinned wafers, discrete micro-pads of ferroelectric material such as lead-strontium titanate can be made in thin form by the appropriate methods as listed above. In all cases, consideration for sufficient thermal isolation of the detectors is essential.

Figure 2:
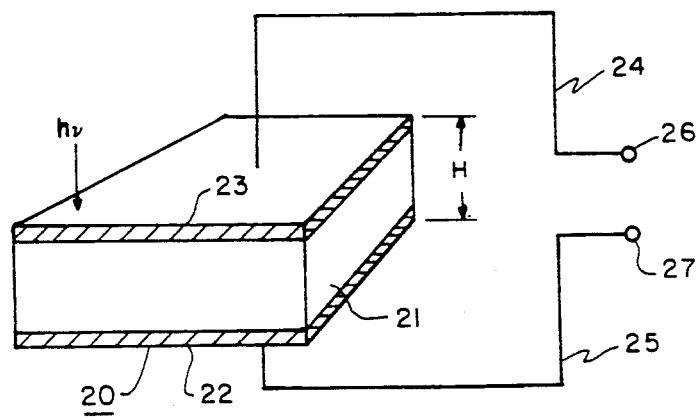
FIG. 2 shows the general structure of a single ferroelectric detector unit made of Lead Strontium Titanate.

FIG. 2 shows a sensor element 20 made from a wafer 21 of ferroelectric material as previously disclosed. The thickness H of the wafer is chosen thick enough to permit complete interaction with penetrating infrared radiation incident thereon, but still thin enough to confine that heat flow until maximum polarization is obtained. The broad surfaces are covered with layers 22 and 23 of conductive materials, one of which obviously must be transparent or discontinuous to pass the IR radiation. These layers accumulate surface charge resulting from the pyroelectric effect which can be removed by leads 24 and 25 to a remote set of terminals 26 and 27.

Figure 3:
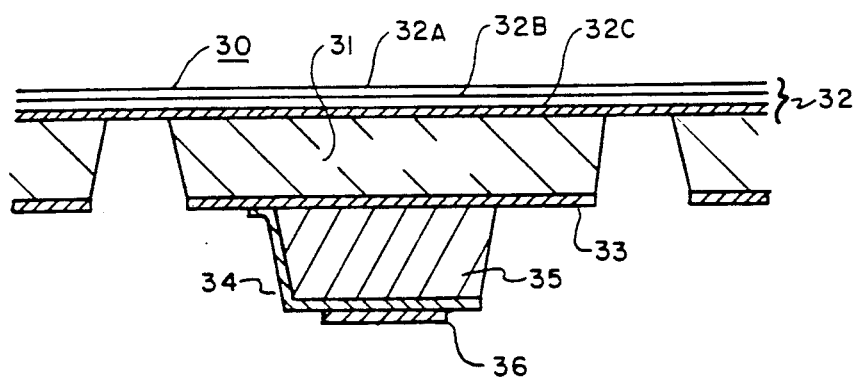
FIG. 3 shows the structure of a single detector in a ferroelectric imaging array, made of Lead Strontium Titanate.

FIG. 3 shows a portion of a ferroelectric sensor array 30 as used in solid state infrared imagers. The array consists of a plurality of small ferroelectric elements 31 such as similar to element 20 in FIG. 2 mounted on a membrane 32. The outer layer 32A of the membrane is an absorber such as lampblack in a suitable binder to efficiently absorb the incoming radiation without reflection. Under the absorber layer is a support layer 32B and a thin common electrical conductive layer 32C. Each ferroelectric element also has an individual conductive electrode element 33 to neutralize only the accumulated surface charge of that element. A separate conductive metal heat dissapating element 34 is bonded to a small fraction of the exposed surface area of the electrode. An insulating element 35 between elements 33 and 34 supports the latter without conducting heat back to element 33. A soldering terminal 36 completes the structure.

Figure 4:
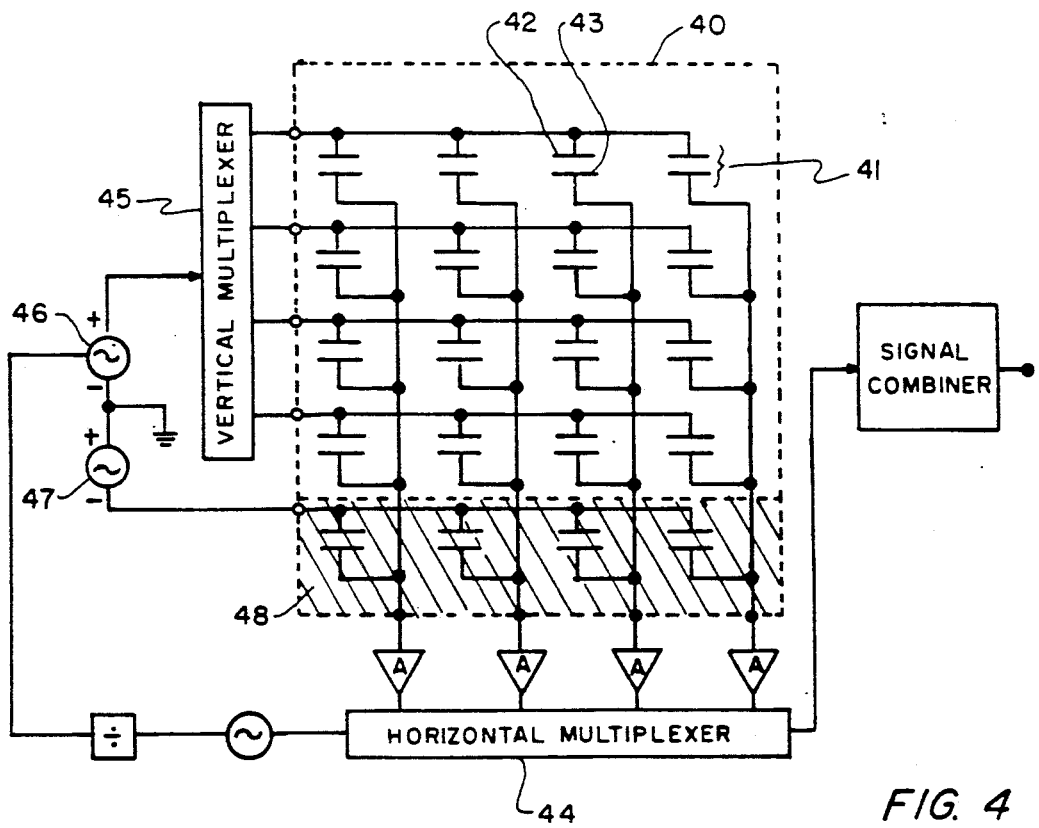
FIG. 4 shows an equivalent electric circuit for the FIG. 3 structure and associated electronics.

FIG. 4 shows an electronic diagram 40 of a typical thermal imager using ferroelectric detectors according to a present design. The detector elements are represented by capacitors 41; the capacities of which are a function of the infrared flux absorbed by the dielectric in each element. The flux normally passes through one or both of the electrodes which is transparent to the flux. One equivalent electrode 42 on each element may be designated as a vertical terminal and the opposite electrode 43 as a horizontal terminal. Horizontal and vertical mulitplexers 44 and 45 scan the terminals in rows and columns respectively at horizontal and vertical frequencies determined by clocks 46 and 47 that are even multiples of one another and phased to provide a standard video type signal. In one row 48 the terminals may be designed to reflect the flux entirely, thus providing a dark threshold level to reduce noise when the video signal is used for display purposes.

The image processing circuitry which interfaces the array of detector elements is best manufactured using silicon integrated circuit technology, so that the detectors and silicon circuits become two interfacing chips. The silicon circuitry may employ charge coupled devices (CCD) as used in portable video camcorders.

I claim:

1. A thermal detector comprising a wafer of ferroelectric material sandwiched between two electrodes, at least one of which is designed to substantially totally absorb said radiation; wherein said material consists of:

$Pb_{(1-x)}Sr_x\ TiO_3$ where x has a value greater than zero and less than one.

2. A detector according to claim 1, wherein: x has a value between 0.01 and 0.99.

3. A detector according to claim 1, wherein: x has a value between 0.64 and 0.68.

4. A detector according to claim 1, wherein: said detector is a sensor for a thermal imager.

5. A detector according to claim 3, wherein: said detector is a sensor for a thermal imager.

* * * * *